United States Patent
Toya

(10) Patent No.: US 11,647,740 B2
(45) Date of Patent: May 16, 2023

(54) FISHING LINE GUIDE MEMBER AND FISHING ROD PROVIDED WITH SAME

(71) Applicant: Kyocera Corporation, Kyoto (JP)

(72) Inventor: Yuuki Toya, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 107 days.

(21) Appl. No.: 16/488,610

(22) PCT Filed: Feb. 23, 2018

(86) PCT No.: PCT/JP2018/006737
§ 371 (c)(1),
(2) Date: Aug. 26, 2019

(87) PCT Pub. No.: WO2018/155638
PCT Pub. Date: Aug. 30, 2018

(65) Prior Publication Data
US 2020/0196583 A1 Jun. 25, 2020

(30) Foreign Application Priority Data

Feb. 27, 2017 (JP) .............................. JP2017-035007

(51) Int. Cl.
*A01K 87/04* (2006.01)

(52) U.S. Cl.
CPC .................... *A01K 87/04* (2013.01)

(58) Field of Classification Search
CPC ........ A01K 87/04; A01K 87/00; A01K 87/02; A01K 89/00; A01K 91/02; A01K 97/00; A01K 89/015; A01K 89/017
USPC ............................................. 43/24, 25, 18.5
See application file for complete search history.

(56) References Cited

U.S. PATENT DOCUMENTS

| 6,161,786 A | * | 12/2000 | Ohara ................ A01K 89/0108 242/157 R |
| 2007/0044588 A1 | * | 3/2007 | Hamamura ....... C04B 35/58021 75/234 |
| 2012/0066956 A1 | * | 3/2012 | Lyngstadaas .......... A01K 85/00 43/42.25 |
| 2012/0321906 A1 | * | 12/2012 | McCrea ................... C08J 7/046 428/35.9 |
| 2013/0192120 A1 | * | 8/2013 | Akiba .................... A01K 87/04 43/24 |

FOREIGN PATENT DOCUMENTS

JP   H07237965 A   9/1995
JP   2001321031 A   11/2001

* cited by examiner

*Primary Examiner* — Peter M Poon
*Assistant Examiner* — Jeffrey R Larsen
(74) *Attorney, Agent, or Firm* — Viering, Jentschura & Partner mbB

(57) ABSTRACT

A fishing line guide member may include a line contacting surface that is in contact with a fishing line. The line contacting surface may have an arithmetic mean roughness Ra of 0.4 μm or less, the arithmetic mean roughness Ra being obtained from a roughness profile. Further, the line contacting surface may have a core roughness depth Rk of 0.3 μm or more and 1.5 μm or less, the core roughness depth Rk being obtained from the roughness profile.

12 Claims, 1 Drawing Sheet

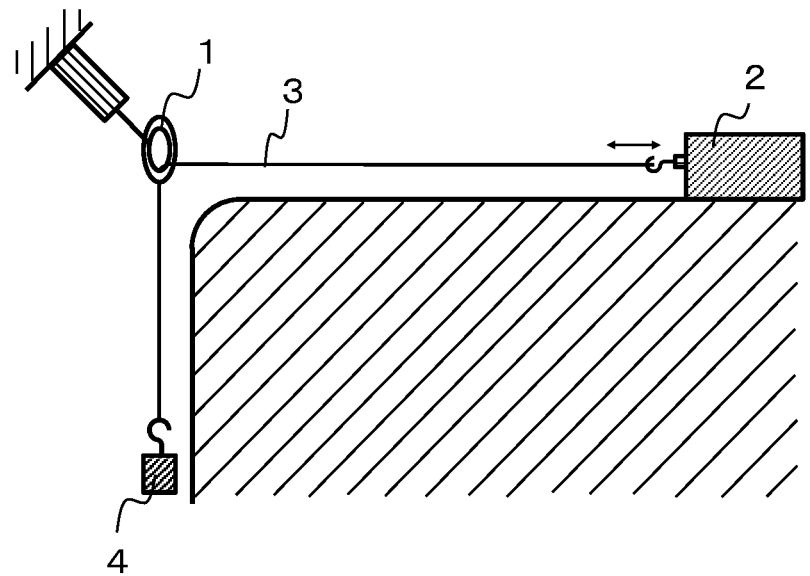

FISHING LINE GUIDE MEMBER AND FISHING ROD PROVIDED WITH SAME

CROSS-REFERENCE TO RELATED APPLICATIONS

This application is a national stage entry according to 35 U.S.C. 371 of International Application No. PCT/JP2018/006737 filed on Feb. 23, 2018, which claims priority to Japanese Patent Application No. 2017-035007 filed on Feb. 27, 2017, the contents of which are entirely incorporated herein by reference.

TECHNICAL FIELD

The present disclosure relates to a fishing line guide member and a fishing rod provided with the same.

BACKGROUND

Fishing using a reel, e.g., casting, lure fishing, etc., has been widely distributed. For such fishing, a fishing rod, to which a plurality of guide members of a ring shape (hereinafter, referred to as a fishing line guide member) are attached, is used. Then, a fishing line is guided by the fishing line guide members.

For example, Japanese Unexamined Patent Publication JP-A 2001-321031 (Patent Literature 1) discusses a fishing line guide member formed of a ceramic material, and the fishing line guide member includes a through hole that guides a fishing line having a diameter of 0.1 mm or greater, wherein an average irregularity diameter of a surface of a region corresponding to ⅕ of a whole from at least an opening end of the through hole is 50 μm to 200 μm.

SUMMARY

A fishing line guide member according to a non-limiting aspect of the disclosure may include a surface in contact with a fishing line (hereinafter, referred to as a line contacting surface). In addition, the line contacting surface may have an arithmetic mean roughness Ra of 0.4 μm or less, the arithmetic mean roughness Ra being obtained from a roughness profile. Moreover, the line contacting surface may have a core roughness depth Rk of 0.3 μm or more and 1.5 μm or less, the core roughness depth Rk being obtained from the roughness profile.

BRIEF DESCRIPTION OF DRAWINGS

The FIGURE is a schematic diagram showing an example of a sliding characteristic evaluation device used to evaluate a sliding characteristic on a line contacting surface of a fishing line guide member according to a non-limiting aspect of the disclosure.

DETAILED DESCRIPTION

Recently, in lure fishing, the number of throwing and rewinding operations of a lure are large, and thus a relatively thin line is frequently used to use a light lure. When the thin line is used, a load on the line increases and the line is likely to be broken. Accordingly, the fishing line guide member attached to the fishing rod is required to smoothly guide the fishing line for a long period of time.

The fishing line guide member according to a non-limiting aspect of the disclosure can smoothly guide the fishing line for a long period of time. Hereinafter, the fishing line guide member according to a non-limiting aspect of the disclosure will be described below.

The fishing line guide member according to a non-limiting aspect of the disclosure includes a line contacting surface that is in contact with the fishing line. In addition, the line contacting surface has an arithmetic mean roughness Ra of 0.4 μm or less, the arithmetic mean roughness Ra being obtained from a roughness profile. Moreover, the line contacting surface has a core roughness depth Rk of 0.3 μm or more and 1.5 μm or less, the core roughness depth Rk being obtained from the roughness profile.

Here, the arithmetic mean roughness Ra is a value regulated in JIS B 0601 (2013). In addition, the core roughness depth Rk is regulated in JIS B 0671-2 (2002), and is defined as follows. First, in a central portion of a material ratio curve including 40% of measurement points in the roughness profile, a straight light that makes a split line of the material ratio curve drawn to set a difference of a load length ratio to be 40% the gentlest slope is assumed to be an equivalent straight line. Next, a space between two height positions that are generated when the equivalent straight line crosses a vertical axis at locations where the load length ratio of 0% and 100% is assumed as a core. In addition, the core roughness depth Rk is an index indicating a level difference between an upper side and a lower side of the core.

In addition, since the fishing line guide member according to a non-limiting aspect of the disclosure satisfies the above configuration, irregularity on the line contacting surface is small, and a variation in a core height is small, the fishing line may be smoothly guided for a long period of time.

In addition, the line contacting surface in the fishing line guide member according to a non-limiting aspect of the disclosure may have a peak count Pc of 5 or more and 25 or less, the peak count Pc being obtained from the roughness profile. Here, the peak count Pc is regulated in JIS B 0601 (2013), and when an average height of the roughness is set as a center line, the peak count Pc is an index indicating the number of portions becoming a peak and a valley with respect to the center line per unit height (10 mm).

The fishing line guide member according to a non-limiting aspect of the disclosure, which satisfies the above configuration, can smoothly guide the fishing line because a contact area with the line contacting surface is small when guiding the fishing line.

In addition, the line contacting surface in the fishing line guide member according to a non-limiting aspect of the disclosure may have a kurtosis Rku of less than 3, the kurtosis Rku being obtained from the roughness profile. Here, the kurtosis Rku is regulated in JIS B 0601 (2013), and is an index indicating a criterion of surface sharpness. In detail, when the kurtosis Rku is less than 3, a vicinity of a vertex of a portion becoming the peak and valley is rounded.

The fishing line guide member satisfying the above configuration according to a non-limiting aspect of the disclosure can smoothly guide the fishing line because the line contacting surface is less likely to damage the fishing line when guiding the fishing line.

In addition, the line contacting surface in the fishing line guide member according to a non-limiting aspect of the disclosure may have a total height of profile Rt of 1.0 μm or more and 3.2 μm or less, the total height of profile Rt being obtained from the roughness profile. Here, the total height of profile Rt is regulated in JIS B 0601 (2013), and is an index indicating a total of a maximum profile peak height and a maximum profile valley depth along an evaluation length.

The fishing line guide member satisfying the above configuration according to a non-limiting aspect of the disclosure has a small contact area with the fishing line when guiding the fishing line, and because there are few protruding peaks and valleys, the fishing line can be smoothly guided.

In the line contacting surface of the fishing line guide member according to a non-limiting aspect of the disclosure, a mean width of profile elements RSm, the mean width of profile elements RSm being obtained from the roughness profile, may be set to be 45 μm or more and 95 μm or less. Here, the mean width of profile elements RSm is regulated in JIS B 0601 (2013), and assuming that a sum of lengths of center lines corresponding to one peak and neighboring valley is an interval between the peak and the valley, the mean width of profile elements RSm is an index indicating an average value of the intervals.

The fishing line guide member satisfying the above configuration according to a non-limiting aspect of the disclosure has a small contact area with the fishing line when guiding the fishing line, and because the fishing line is less likely to leap, the fishing line can be smoothly guided.

In the line contacting surface of the fishing line guide member according to a non-limiting aspect of the disclosure, the arithmetic mean roughness Ra, the peak count Pc, the kurtosis Rku, the total height of profile Rt, and the mean width of profile elements RSm can be determined by being measured based on JIS B 0601 (2013), and the core roughness depth Rk can be obtained by being measured based on JIS B 0671-2 (2002). Measurement conditions may include, for example, a measurement length of 1.0 mm, a cut-off value of 0.25 mm, and a scanning speed of 0.3 mm/second with a stylus having a stylus radius of 5 μm. Then, measurement is performed along a direction of guiding the fishing line on at least three points in the line contacting surface, and an average value of obtained values may be calculated.

In addition, the line contacting surface of the fishing line guide member according to a non-limiting aspect of the disclosure may be formed of any type of material. However, when the line contacting surface is made of ceramics, the line contacting surface has an excellent abrasion resistance as compared with a case in which the line contacting surface is made of metal, a resin, etc., and thus, damage to the fishing line may be further reduced. Moreover, when the line contacting surface is made of aluminum oxide-based ceramics among the ceramics, the line contacting surface may have more excellent abrasion resistance as compared with a case in which the line contacting surface is made of zirconia-based ceramics, etc. Here, the aluminum oxide-based ceramics contains aluminum oxide of 80% by mass or greater with respect to all components of the ceramics taken as 100% by mass.

That is, the line contacting surface made of the aluminum oxide-based ceramics may be manufactured by coating a surface of the guide member including metal or resin with aluminum oxide-based ceramics. However, when the fishing line guide member itself is manufactured by using the aluminum oxide-based ceramics, a durability may be further improved.

In addition, a material of the line contacting surface can be confirmed by the following method. First, the line contacting surface is measured by using an X-ray diffractometer (XRD), and an identification is performed from an obtained value 2θ (2θ is a diffraction angle) by using a JCPDS card. Next, a quantitative analysis of a component is performed by using a fluorescent X-ray analyzer (XRF). When the presence of aluminum oxide is confirmed through the above identification and the value converted from a content of aluminum (Al) measured by the XRF to the aluminum oxide ($Al_2O_3$) is 80% by mass or greater, it is identified as the aluminum oxide-based ceramics.

In addition, the fishing rod according to a non-limiting aspect of the disclosure includes the fishing line guide member according to a non-limiting aspect of the disclosure. Thus, since the fishing rod of a non-limiting aspect of the disclosure includes the fishing line guide member capable of smoothly guiding the fishing line for a long period of time, it is less likely to break the fishing line and reliability may be improved.

Hereinafter, a method of manufacturing a fishing line guide member according to a non-limiting aspect of the disclosure will be described. Also, the fishing line guide member that is made of aluminum oxide-based ceramics will be described as an example.

First, aluminum oxide ($Al_2O_3$) powder that is a main raw material is put into a mill with a sintering aid, a solvent, and a ball, and then is ground to a predetermined particle size to prepare a slurry. Next, after adding a binder to the obtained slurry, granulated fine particles are obtained by spraying and drying the slurry by using a spray-dryer (spraying-drying apparatus).

Next, this fine particles, a thermoplastic resin, wax, etc. are put into a kneader and are kneaded while being heated to obtain a body. Then, the obtained body is put into a pelletizer, and then, a pellet that becomes a raw material for injection molding is obtained. Next, the obtained pellet is put into an injection molding machine to be injection molded, and then a molded body having a shape of the fishing line guide member is obtained.

In order to obtain the molded body having the shape of the fishing line guide member as described above, a shaping mold for obtaining the shape of the fishing line guide member is manufactured based on a general injection molding method, and may be installed in an injection molding machine so that injection molding is performed. Then, a surface texture of an inner surface of the shaping mold is transferred to a surface of the molded body, in order to obtain the line contacting surface having and the arithmetic mean roughness Ra of 0.4 μm or less and the core roughness depth Rk of 0.3 μm or more and 1.5 μm or less, the molded body may be manufactured by using the shaping mold having a surface texture in an inner surface thereof, wherein the surface texture is determined in consideration of a polishing amount caused due to a surface treatment such as a barrel polishing, etc. after the firing. Further, in the line contacting surface, the above is identically applied to a case in which the peak count Pc may be set to be 5 or more and 25 or less, the kurtosis Rku may be set to be less than 3, the total height of profile Rt may be set to be 1.0 μm or more and 3.2 μm or less, or the mean width of profile elements RSm may be set to be 45 μm or more and 95 μm or less.

In addition, after degreasing the obtained molded body, a sintered body is obtained by holding and firing the molded body for 1 to 4 hours to a maximum temperature of 1350° C. or higher and 1500° C. or lower under an atmospheric environment. Further, a temperature rising rate from a temperature of 1000° C. to the maximum temperature may be 80 to 150° C./hour.

In addition, the obtained sintered body is barrel-polished to obtain the fishing line guide member according to a non-limiting aspect of the disclosure. In addition, since the firing condition varies depending on a shape and a size of a product, the firing condition may be adjusted according to necessity.

Hereinafter, examples of a non-limiting aspect of the disclosure will be described in detail, but the disclosure is not limited to these examples.

Example 1

Samples (fishing line guide member) having different arithmetic mean roughnesses Ra and different core roughness depths Rk in line contacting surfaces were manufactured, and sliding characteristics was evaluated.

First, aluminum oxide powder, titanium oxide powder, pigment component powder, and sintering aid powder were prepared. Here, the pigment component powder was prepared by weighing and mixing chromium oxide powder, manganese oxide powder, cobalt oxide powder, and iron oxide powder at a mass ratio of 23:21:53:3. In addition, the sintering aid powder was prepared by weighing and mixing silicon oxide powder and magnesium hydroxide powder at a mass ratio of 2:1.

In addition, after the sintering, respective powder was weighed so that aluminum oxide was 93% by mass in terms of $Al_2O_3$, titanium oxide was 2% by mass in terms of $TiO_2$, the pigment component was 4% by mass, and the sintering aid powder was 1% by mass, and water was added and put into a mill with a ball to be pulverized and mixed to manufacture a slurry.

Next, a binder was added to the slurry, and after that, granulated fine particles were obtained by spraying and drying the slurry by using a spray-dryer. Then, a thermoplastic resin and wax were added to the obtained fine particles, and then were put into a kneader to be kneaded while being heated to obtain a body. Next, the obtained body was put into a pelletizer to obtain a pellet that is a raw material for injection molding. Then, the pellet was put into an injection molding machine to obtain a molded body having a shape of a fishing line guide member.

Here, the surface properties on the inner surface of a shaping mold provided in the injection molding machine were set so that the line contacting surface of each sample had the arithmetic mean roughness Ra and the core roughness depth Rk as illustrated in Table 1 below, in consideration of the polishing amount caused due to the barrel polishing after the firing.

Next, the molded body having the shape of the fishing line guide member was fired at a maximum temperature of 1420° C. under an atmospheric environment with a retention time of 2 hours at the maximum temperature, and a sintered body having the shape of the fishing line guide member was obtained. In addition, the obtained sintered body was barrel-polished, and thus each sample of a ring shape having a thickness of 1.7 mm, a width of 2.3 mm, and an outer diameter of 14.4 mm was obtained.

Then, for each of the obtained samples, the arithmetic mean roughness Ra and the core roughness depth Rk in the line contacting surface were measured by using a contact type surface roughness meter based on JIS B 0601 (2013) and JIS B 0671-2 (2002). The measurement conditions were set to have a measurement length of 1.0 mm, a cut-off value of 0.25 mm, and a scanning speed of 0.3 mm/second with a stylus having a stylus radius of 5 μm. Then, the calculated values were obtained by performing measurement at three points of the line contacting surface along a direction of guiding the fishing line, and then an average value of the calculated values was obtained.

Next, a sliding characteristic of the line contacting surface in each sample with respect to the fishing line was evaluated by using the sliding characteristic evaluation device shown in the FIGURE. Here, as shown in the FIGURE, the sliding characteristic evaluation device is a device in which a fishing line 3 connected to a cylinder 2 passes through each sample 1 (fishing line guide member) and a sinker 4 is suspended from a tip of the fishing line 3 hanging from each sample 1 as a starting point, and in this state, the fishing line is slid by reciprocating the cylinder 2 at a constant speed and stroke. Then, a test was performed under such conditions that a weight of the sinker was 4.5 kg, the stroke of the cylinder was 300 mm, and one reciprocation was performed within three seconds, and a time period taken for the fishing line 3 to break in each sample was measured.

In addition, each sample was ranked in an order from the longest time taken for the fishing line 3 to break. In other words, the sample with the longest time taken for the fishing line 3 to break was ranked first, and the sample with the shortest time taken for the fishing line 3 to break was ranked lowest. In addition, as the time taken for the fishing line 3 to break is increased, it indicates that the fishing line may be smoothly guided for a long period of time.

Results are shown in Table 1.

TABLE 1

| Sample No. | Ra (μm) | Rk (μm) | Rank |
|---|---|---|---|
| 1 | 0.5 | 1.6 | 9 |
| 2 | 0.4 | 1.6 | 7 |
| 3 | 0.4 | 1.5 | 4 |
| 4 | 0.3 | 1.3 | 2 |
| 5 | 0.2 | 1.0 | 1 |
| 6 | 0.2 | 0.7 | 3 |
| 7 | 0.2 | 0.3 | 5 |
| 8 | 0.1 | 0.3 | 6 |
| 9 | 0.1 | 0.2 | 8 |

As shown in Table 1, since sample Nos. 3 to 8 are highly ranked, it can be understood that, when the arithmetic mean roughness Ra is 0.4 μm or less and the core roughness depth Rk is 0.3 μm or more and 1.5 μm or less in the line contacting surface, the fishing line may be smoothly guided for a long period of time.

Example 2

Samples having different peak counts Pc in the line contacting surface were manufactured, and sliding characteristics were evaluated.

The manufacturing method was the same as that of sample No. 5 according to Example 1, except that the surface texture of an inner surface of the shaping mold provided in the injection molding machine is changed so that the line contacting surface in each sample may have the peak count Pc as shown in Table 2 in consideration of the polishing amount caused due to the barrel polishing after the firing. Sample No. 10 is the same as sample No. 5 according to Example 1.

In addition, for each of the obtained samples, the peak count Pc of the line contacting surface was measured, and the measurement condition was same as that of Example 1. A sliding characteristic of the line contacting surface in each sample with respect to the fishing line was evaluated by the same method as that of Example 1.

Results are shown in Table 2. In addition, ranking in Table 2 is obtained only by comparing samples of Table 2.

TABLE 2

| Sample No. | Pc | Rank |
| --- | --- | --- |
| 10 | 27 | 7 |
| 11 | 25 | 5 |
| 12 | 20 | 3 |
| 13 | 14 | 1 |
| 14 | 11 | 2 |
| 15 | 5 | 4 |
| 16 | 4 | 6 |

As shown in Table 2, since sample Nos. 11 to 15 are highly ranked, it can be understood that, when the peak count Pc of the line contacting surface is 5 or more and 25 or less, the fishing line may be smoothly guided for a long time period.

Example 3

Samples having different kurtosises Rku in line contacting surfaces were manufactured, and sliding characteristics were evaluated.

The manufacturing method was the same as that of sample No. 13 according to Example 2, except that the surface texture of an inner surface of a shaping mold provided in an injection molding machine is changed so that the line contacting surface of each sample may have the kurtosis Rku shown in Table 3 in consideration of the polishing amount caused due to the barrel polishing after the firing. Sample No. 17 is the same as sample No. 13 according to Example 2.

In addition, for each of the obtained samples, the kurtosis Rku in the line contacting surface was measured, and measurement condition was the same as that in Example 1. A sliding characteristic of the line contacting surface in each sample with respect to the fishing line was evaluated by the same method as that of Example 1.

Results are shown in Table 3. Ranking in Table 3 is obtained only by comparing samples of Table 3.

TABLE 3

| Sample No. | Rku | Rank |
| --- | --- | --- |
| 17 | 4.2 | 2 |
| 18 | 2.1 | 1 |

As shown in Table 3, sample No. 18 is highly ranked as compared with the sample No. 17. According to the result, it can be understood that, when the kurtosis of the line contacting surface is less than 3, the fishing line can be smoothly guided for a longer period of time.

Example 4

Samples having different total heights of profile Rt in line contacting surfaces were manufactured, and sliding characteristics were evaluated.

The manufacturing method was the same as that of sample No. 18 according to Example 3, except that the surface texture of an inner surface of a shaping mold provided in an injection molding machine is changed so that the line contacting surface of each sample may have the total height of profile Rt as shown in Table 4 in consideration of the polishing amount caused due to the barrel polishing after the firing. Sample No. 19 is the same as sample No. 18 according to Example 3.

In addition, for each of obtained samples, the total height of profile Rt of the line contacting surface was measured, and the measurement condition was the same as that in Example 1. Also, a sliding characteristic of the line contacting surface in each sample with respect to the fishing line was evaluated by the same method as that of Example 1.

Results are shown in Table 4. Ranking in Table 4 is obtained only by comparing samples of Table 4.

TABLE 4

| Sample No. | Rt (μm) | Rank |
| --- | --- | --- |
| 19 | 3.4 | 4 |
| 20 | 3.2 | 2 |
| 21 | 2.1 | 1 |
| 22 | 1.0 | 3 |
| 23 | 0.8 | 5 |

As shown in Table 4, since sample Nos. 20 to 22 are highly ranked, it can be understood that, when the total height of profile Rt in the line contacting surface is 1.0 μm or more and 3.2 μm or less, the fishing line can be smoothly guided for a longer period of time.

Example 5

Samples having different mean widths of profile elements RSm in line contacting surface were manufactured, and sliding characteristics were evaluated.

The manufacturing method was the same as that of sample No. 21 according to Example 4, except that the surface texture of an inner surface of a shaping mold provided in an injection molding machine is changed so that the line contacting surface of each sample may have the mean width of profile elements RSm as shown in Table 5 in consideration of the polishing amount caused due to the barrel polishing after the firing. Sample No. 24 is the same as sample No. 21 according to Example 4.

In addition, for each of obtained samples, the mean width of profile elements RSm in the line contacting surface was measured, and the measurement condition was the same as that in Example 1. Also, a sliding characteristic of the line contacting surface in each sample with respect to the fishing line was evaluated by the same method as that of Example 1.

Results are shown in Table 5. Ranking in Table 5 is obtained only by comparing samples of Table 5.

TABLE 5

| Sample No. | RSm (μm) | Rank |
| --- | --- | --- |
| 24 | 100 | 4 |
| 25 | 95 | 2 |
| 26 | 72 | 1 |
| 27 | 45 | 3 |
| 28 | 41 | 5 |

As shown in Table 5, since sample Nos. 25 to 27 are highly ranked, it can be understood that, when the mean width of profile elements RSm on the line contacting surface is 45 μm or more and 95 μm or less, the fishing line may be smoothly guided for a longer period of time.

REFERENCE SIGNS LIST

1: Fishing line guide member
2: Cylinder

3: Fishing line
4: Sinker

What is claimed is:

1. A fishing line guide member, comprising:
a line contacting surface that is in contact with a fishing line,
the line contacting surface having an arithmetic mean roughness Ra of 0.2 μm or more and 0.4 μm or less, the arithmetic mean roughness Ra being obtained from a roughness profile, and a core roughness depth Rk of 0.3 μm or more and 1.5 μm or less, the core roughness depth Rk being obtained from the roughness profile.

2. The fishing line guide member according to claim 1, wherein
the line contacting surface has a peak count Pc of 5 or more and 25 or less, the peak count Pc being obtained from the roughness profile.

3. The fishing line guide member according to claim 1, wherein
the line contacting surface has a kurtosis Rku of less than 3, the kurtosis Rku being obtained from the roughness profile.

4. The fishing line guide member according to claim 1, wherein
the line contacting surface has a total height of profile Rt of 1.0 μm or more and 3.2 μm or less, the total height of profile Rt being obtained from the roughness profile.

5. The fishing line guide member according to claim 1, wherein
the line contacting surface has a mean width of profile elements RSm of 45 μm or more and 95 μm or less, the mean width of profile elements RSm being obtained from the roughness profile.

6. The fishing line guide member according to claim 1, wherein
the line contacting surface is made of aluminum oxide-based ceramics comprising aluminum oxide in an amount of 80 mass % or greater with respect to all components of the aluminum-oxide based ceramics taken as 100 mass %.

7. A fishing rod, comprising:
the fishing line guide member according to claim 1.

8. A fishing line guide member, comprising:
a line contacting surface that is configured to contact a fishing line,
the line contacting surface having:
an arithmetic mean roughness Ra of 0.2 μm or more and 0.4 μm or less, the arithmetic mean roughness Ra being obtained from a roughness profile;
a core roughness depth Rk of 0.3 μm or more and 1.5 μm or less, the core roughness depth Rk being obtained from the roughness profile;
a peak count Pc of 5 or more and 25 or less, the peak count Pc being obtained from the roughness profile; and
the line contacting surface has a mean width of profile elements RSm of 45 μm or more and 95 μm or less, the mean width of profile elements RSm being obtained from the roughness profile.

9. The fishing line guide member according to claim 8, wherein
the line contacting surface has a kurtosis Rku of less than 3, the kurtosis Rku being obtained from the roughness profile.

10. The fishing line guide member according to claim 8, wherein
the line contacting surface has a total height of profile Rt of 1.0 μm or more and 3.2 μm or less, the total height of profile Rt being obtained from the roughness profile.

11. The fishing line guide member according to claim 8, wherein
the line contacting surface is made of aluminum oxide-based ceramics comprising aluminum oxide in an amount of 80 mass % or greater with respect to all components of the aluminum-oxide based ceramics taken as 100 mass %.

12. A fishing rod, comprising:
the fishing line guide member according to claim 8.

* * * * *